United States Patent [19]

Hirobe et al.

[11] 4,213,558
[45] Jul. 22, 1980

[54] CONTINUOUS CASTING AND CLADDING PROCESS AND APPARATUS FOR PRODUCING METAL CLAD

[75] Inventors: Koei Hirobe, Nishinomiya; Kiyomi Yanagida, Suita; Tadashi Hirokane; Akihiko Takahashi, both of Nagoya, all of Japan

[73] Assignees: Sumitomo Aluminum Smelting Company, Ltd., Osaka; Nihon Atsuen Kogyo K.K., Itami, both of Japan

[21] Appl. No.: 973,171

[22] Filed: Dec. 26, 1978

[30] Foreign Application Priority Data

Dec. 26, 1977 [JP] Japan .................................. 52-160651

[51] Int. Cl.² .............................................. B23P 3/06
[52] U.S. Cl. ................................ 228/176; 29/527.7; 164/76; 164/417; 228/4.1; 228/18; 228/243
[58] Field of Search ............... 228/176, 235, 243, 4.1, 228/5.1, 18, 44.1 R; 29/527.7; 164/76, 86, 417

[56] References Cited
U.S. PATENT DOCUMENTS

| | | | |
|---|---|---|---|
| 2,301,902 | 11/1942 | Merle | 164/86 |
| 2,827,809 | 3/1958 | Beam | 228/4.1 |
| 3,436,804 | 4/1969 | Broverman | 228/243 |
| 3,650,455 | 3/1972 | Rutter et al. | 228/4.1 X |
| 3,734,384 | 5/1973 | Kozak et al. | 228/4.1 |
| 3,971,123 | 7/1976 | Olsson | 29/527.7 |

*Primary Examiner*—Francis S. Husar
*Assistant Examiner*—K. J. Ramsey
*Attorney, Agent, or Firm*—Wenderoth, Lind & Ponack

[57] ABSTRACT

A method and apparatus for continuously producing clad metal plate employing a continuous casting apparatus. Sheet metal cladding is fed onto one or both faces of the hot solidified continuously cast strip being withdrawn from the casting means and the assembly is then passed to a hot roll bonding system for cladding. A method of producing clad aluminum or aluminum alloy according to the above process is further disclosed.

15 Claims, 7 Drawing Figures

FIG. 5
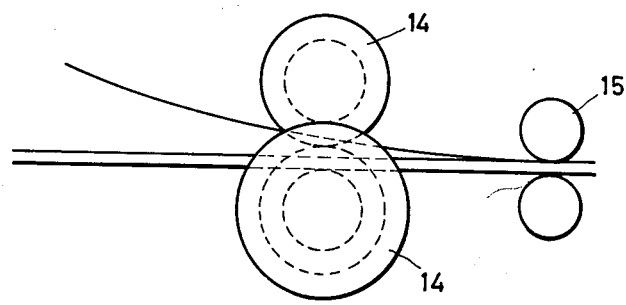
FIG. 6
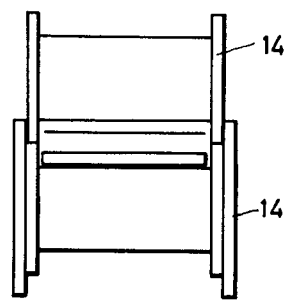
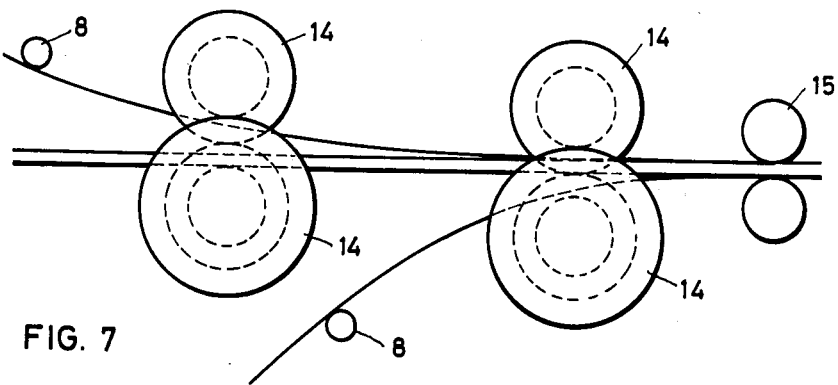
FIG. 7

CONTINUOUS CASTING AND CLADDING PROCESS AND APPARATUS FOR PRODUCING METAL CLAD

The present invention relates to a continuous casting and cladding method and apparatus for the production of metal clads, and more particularly to a method and apparatus for continuously producing a metal clad by continuously casting a molten metal into an endless solidified sheet or strip by the continuous strip casting process, overlaying one or both faces of the hot sheet or strip with a metal cladding material continuously supplied thereto, and hot-rolling the resulting assembly of the sheet or strip and cladding material.

The term "continuous casting" as used in the present specification refers to a casting method employing the so-called "continuous strip casting process" in which a molten metal is poured into one end of a water-cooled endless mold system to continuously obtain a solidified semi-fabricated sheet or strip at the other end. This method is also called a "continuous casting and rolling process."

The endless mold system includes opposed continuous revolving mold surfaces and comprises, for example, a pair of rolls, a pair of belts, or the combination of a wheel and a belt or of caterpillar type tracks. Typical of such continuous strip casting systems are Hunter Caster, 3C Caster, Hazelett Twin Belt Caster, Mann Rotary Caster, Hunter-Douglas Caster, Alusuisse Caster II, etc. These systems are used for producing sheets or strips of aluminum, zinc, lead, copper and steel.

Metal sheets or strips were usually produced by the series of steps of preheating, hot-rolling and cold-rolling from fabricating ingots which were prepared by casting a molten metal, whereas the continuous strip casting process produces semi-fabricated sheets or strips directly from a molten metal without resorting to the ingot casting and preheating steps. Thus the continuous process is very advantageous in eliminating the necessity of using an ingot preheating furnace or a large-scale hot-rolling apparatus and also in assuring savings in labor and energy. Because of these advantages, the process has found wide use in the production of semi-fabricated aluminum or aluminum alloy sheets or strips.

The continuous strip casting process nevertheless has drawbacks; the cast sheet or strip may possibly contain impurities segregated on its surface or have local variations in the state of the solidified metal. When the semi-fabricated sheet or strip obtained by the process is re-rolled and further subjected to anodic oxidation, such imperfections on the surface will appear in the form of spots or a stretch pattern or cause irregularities in color, giving an impaired appearance to the surface, since the surface layer of the cast sheet or strip has not been removed as by scalping or the reduction involved is relatively low. The sheets or strips obtained by the process are still in greatly limited use, therefore.

The clad rolling process is practiced for producing metal clads by cladding one or both faces of a core metal with a cladding material in a suitable combination of different metals or alloys to give the resulting product the excellent properties of both metals or improved surface characteristics.

According to the clad rolling process, the core metal and the cladding material are joined to each other as by welding, then thoroughly preheated in a soaking furnace and thereafter hot-rolled. The process is therefore inefficient.

An object of this invention is to overcome the drawbacks of the foregoing two processes and to provide an apparatus for continuously producing clad sheets or strips having outstanding properties.

Another object of this invention is to provide a method of continuously producing, with the use of the apparatus, metal clads, especially clad aluminum or clad aluminum alloys incorporating an aluminum or aluminum alloy core.

Stated more specifically, this invention provides a continuous casting and cladding apparatus for the production of metal clads comprising means for continuously casting a molten metal having a continuous mold system and cooling means, the mold system including a pair of rolls, a pair of belts, or the combination of a belt and a wheel or of caterpillar type tracks; at least one uncoiler having rotation restraining means for feeding a sheet or strip of cladding material; means for adjusting the feed of the cladding material onto at least one surface of a hot solidified cast sheet or strip withdrawn from the casting means, the feed adjusting means including a group of guide rolls and a guide plate and being operable at a variable speed in synchronism with a proper line speed; an overlaying unit for fitting the cladding material to the hot cast sheet or strip without permitting projection of the cladding material from the edges of the cast sheet or strip; pinch rolls for feeding the resulting assembly of the cast sheet or strip and the cladding material to a subsequent hot-rolling process; and hot rolls.

The apparatus and method of this invention will be described below in greater detail with reference to the accompanying drawings, in which:

FIG. 5 is a side elevation showing another overlaying unit comprising horizontal grooved rolls and adapted for single-free cladding;

FIG. 6 is a front view showing the horizontal grooved rolls; and

FIG. 7 is a side elevation showing another overlaying unit comprising horizontal grooved rolls and adapted for double-face cladding.

Figure 1:
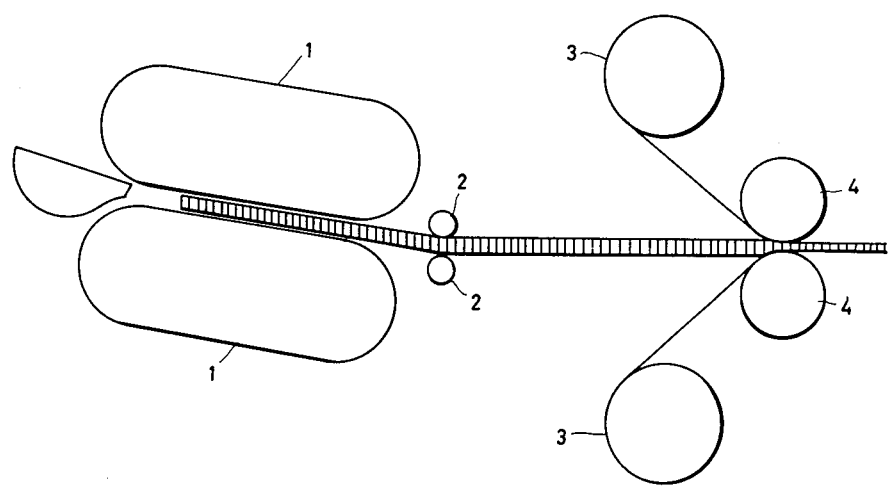
FIG. 1 is a diagram schematically showing an apparatus embodying the invention.

With reference to FIG. 1, a sheet or strip cast by a continuous caster 1 (shown as a twin belt caster) is withdrawn therefrom by pinch rolls 2. Cladding material feeders, each comprising an uncoiler 3, guide rolls or the like, feed sheets of cladding material to hot rolls 4 with the cladding sheets brought into contact with the opposite surfaces of the cast sheet or strip, whereby a metal clad is continuously produced.

The apparatus of this invention will be described below more specifically with reference to FIG. 2. For simplification, the following description will be given of a single-face cladding operation in which the upper surface of the cast sheet or strip is cladded, unless otherwise stated. As already described, the continuous caster 1 has a mold system and cooling means, the mold system comprising a pair of rolls, a pair of belts, or the combination of a belt and a wheel or of catapillar type tracks. By way of a melting furnace and holding furnace, a molten metal is fed, through a suitable spout, to one end of the mold system and cooled by the cooling means to a solidified cast sheet or strip 5, which is withdrawn from the other end of the mold system. It is advantageous to use the pinch rolls 2 shown in FIG. 1 to withdraw the cast sheet or strip 5 at a finely adjusted line speed. A cladding material 6 is unwound from an uncoiler (or uncoilers) 3 and fed through feed adjusting means onto one surface (or onto both surfaces, for double-face cladding) of the hot cast sheet or strip 5 withdrawn from the continuous caster 1. The uncoiler 3 is provided with means, such as the illustrated brake belt 7, for restraining the rotation of the uncoiler 3. The cladding material and the hot cast sheet or strip are adapted to be fed to the hot rolls in timed relation to each other by the restraining means and feed adjusting means. One uncoiler 3 may be provided for one surface to be cladded, but it is preferable to use two uncoilers alternately to render the overall apparatus continuously operable. It is also effective to install the uncoiler 3 within a hot chamber equipped with an appropriate preheater. The cladding material 6 unwound from the uncoiler 3 is continuously fed to the upper surface of the cast sheet or strip 5 by the feed adjusting means comprising a group of guide rolls 8 and guide plate 9.

Like the uncoiler 3 which is under the control of the restraining means, the feed adjusting means for the cladding material is operable at a variable speed so that the cladding material can be fed in synchronism with the line speed at the hot rolls 4. Further since the cast sheet or strip 5 does not always pass a specified position during travel, it is advantageous, for example, to provide a gate roll on the path of travel of the cast sheet or strip to transmit the shift thereof to the feed adjusting means and control the feed adjusting means. This permits effective operation of an overlaying unit 10 when the cladding material 6 is subsequently fitted to the cast sheet or strip 5.

Figure 3:
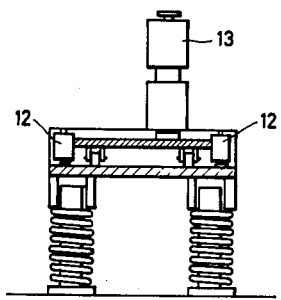
FIG. 3 is a side elevation showing an overlaying unit including vertical rolls.
Figure 4:
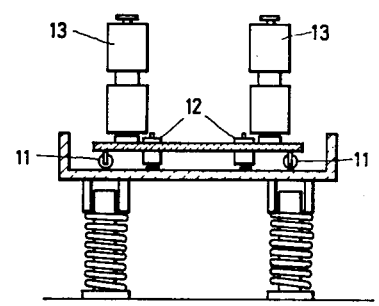
FIG. 4 is a front view showing the overlaying unit.

The hot cast sheet or strip and cladding material thus supplied must be thereafter hot-rolled with the cladding material retained on the core material at least inside the opposite edges of the core material in order to avoid troubles, such as occurrence of faults or an interruption of the operation, which would arise from cracks developed during the rolling step owing to projection of the cladding material from the core edge. FIGS. 3 to 7 show specific examples of the overlaying unit 10 which is provided to preclude such objections. FIGS. 3 and 4 show an overlaying unit including vertical rolls 13 and a base provided with suitable spring means for absorbing variations in the line speed and supporting the vertical rolls 13 thereon, with rollers 11 and fixed rolls 12 provided between the rolls 13 and the base. The rollers 11 are horizontally movable with the horizontal shift of the cast sheet or strip to be supplied. The fixed rolls 12 provide a definite slit width between the vertical rolls 13 during operation. The cast sheet or strip and the cladding material, when passed through the slit width, can be joined together in a proper position relative to each other.

For preventing the edges of the cladding material from cracking that would lead to imperfections during the hot-rolling operation, it is effective that the cladding material have a smaller width than the cast sheet or strip. Advantageously, therefore, the vertical rolls 13 are formed with a groove for passing the cast sheet or strip therethrough, while allowing the cladding material to pass through the remaining portion of the slit having a smaller width than the cast sheet or strip. It is also preferable to provide two or more pairs of vertical rolls in succession for the production of clads with improved precision.

FIGS. 5 to 7 show other overlaying units 10 including horizontal grooved rolls 14, FIG. 5 showing such rolls adapted for single-face cladding, and FIG. 7 those adapted for double-face cladding. With reference to FIG. 6 which shows the former, one grooved roll for the cladding material is positioned above another grooved roll for the cast sheet or strip. The flanges on the lower roll restrain the upper roll from displacement. Advantageously the width of the groove of the lower roll for the cast sheet or strip is larger than that of the upper roll as already stated. It is also advantageous to provide two or more pairs of horizontal grooved rolls in successive arrangement for the production of clads with improved precision.

The cladding material and the hot cast sheet assembled by the overlaying unit 10 are sent to pinch rolls 15 and then to the hot rolls 4. The pinch rolls 15 need only be such that the cladding material and hot cast sheet or strip can be fed to the hot rolls 4 while being retained in the proper position relative to each other.

The assembly delivered from the pinch rolls 15 may be fed directly to the hot rolls 4 by way of a loop or synchrobridge 17 which adjusts the assembly to the desired line speed and imparts suitable tension thereto. To enable the hot rolls 4 to produce a sufficient bonding effect, however, it is preferable to provide a preheating zone 16 comprising a group of guide rolls arranged in series so that the cladding material can be fully preheated by contact with the hot cast sheet or strip prior to hot rolling. The preheating zone 16 may be provided with auxiliary heating means when so desired. It is also desirable for the effective use of the heat to enclose the preheating zone 16 in a closed chamber to prevent the dissipation of the heat.

The preheated assembly is fed to the hot rolls 4 and subjected to reduction in one pass. While a plurality of pairs of hot rolls are usable, the first pair of hot rolls is generally such that a 40% or more reduction can be achieved. Insofar as the assembly is prepared by the component devices of the present apparatus described and then fed to the hot rolls, a water-soluble coolant will not adversely affect the hot-rolling operation if used for the hot rolls when so desired.

The metal clad delivered from the hot rolls 40 upon one-pass reduction may be coiled as it is, or may subsequently be cold-rolled for further reduction and then coiled through a continuous operation.

Although the apparatus of this invention is suited to the production of metal clads composed of various materials in combination, the method of the invention will be described below as it is used for the production of clads incorporating an aluminum or aluminum alloy core as typical examples.

Stated specifically the present invention provides a method of continuously producing clad aluminum or aluminum alloy comprising the steps of continuously feeding molten aluminum or aluminum alloy to one end of a mold space defined by a pair of rolls, a pair of belts, or the combination of a belt and a wheel or of caterpillar type tracks; withdrawing from the other end of the mold space a cast sheet or strip solidified by cooling and having a temperature of about 300° to about 580° C.; feeding a degreased cladding material to at least one surface of the cast sheet or strip in synchronism with a proper line speed; fitting the cladding material to the cast sheet or strip without permitting projection of the cladding material from the edges of the sheet or strip; preheating the cladding material as properly fitted to the cast sheet or strip in contact therewith; and hot-rolling the resulting assembly.

Commercial aluminum or aluminum alloys are usable for continuous casting under controlled casting conditions to form the cores of metal clads, but since the continuous caster inherently involves limitations on the cooling conditions, it is easier to use commercial pure aluminum and aluminum alloys 1100, 3003, 3004, etc. containing a small amount of some other element which are relatively narrower in solidifying temperature range.

The continuously cast sheet or strip generally has a temperature of about 300° to about 580° C. at the outlet of the mold space although the temperature varies considerably in accordance with the thickness of the sheet or strip and the casting system employed. While the thickness usually ranges from about 5 to about 100 mm depending on the casting system, the sheet or strip is preferably as large as possible in thickness, namely in heat capacity, so as to be useful for preheating the cladding material. The outlet temperature of the sheet or strip, as well as the thickness thereof, nevertheless is not particularly limited because the cladding material can be preheated to the desired temperature by the use of a preheater.

Examples of suitable cladding materials are aluminum, copper, zinc and lead and alloys of such metals in view of the bonding of the cladding material to the core material although a desired material is usable, for example, in accordance with the application of the product contemplated.

For instance, when the metal clad is to be subjected to anodic oxidation to form a glossy film thereon, high-purity aluminum, commercial pure aluminum, or aluminum alloy 5052 or the like is useful. Improved platability can be afforded by the use of zinc plates. Copper plates are desirable for giving increased electrical and thermal conductivities. Lead plates are suitable for cladding materials for use in equipment where corrosion resistance is essential.

When such cladding materials are to be applied to the core material, they must be at least in a degreased state free from rolling oil and like contaminants over the surface. When chemically etched or rendered rough-surfaced, the cladding material can be bonded to the core material with enhanced effectiveness.

Obviously the sheet of cladding material should have a width which is equal to or smaller than that of the cast sheet or strip. The thickness of the cladding sheet is determined in accordance with the desired thickness of the cladding material in the clad product to be obtained and with the reduction achieved by the cladding rolling operation.

The cladding material to be supplied need not always be preheated by particular means but can be fully preheated by contact with the cast sheet or strip withdrawn from the continuous caster. In some case, however, it may be preferable to preheat the cladding material to about 100° to about 400° C. although this is dependent on the kind of the cladding material used. The cladding material is fed to the apparatus in synchronism with the speed of the sheet or strip at the outlet of the caster and with the line speed at the cladding hot rolls. There is not need to join the cladding material to the core sheet or strip as by welding.

The cladding material is fed to at least one surface of the cast sheet or strip and fitted thereto without permitting projection of the cladding material from the edges of the core sheet or strip. Preferably, therefore, the cladding material is at least about 2 mm smaller than the core sheet or strip in width. Should the cladding material project from the core sheet or strip sidewise, cracks will develop in the cladding material during hot rolling, consequently making it impossible to obtain satisfactory metal clads.

The resulting assembly can be fed directly to the hot rolls as suitably tensioned by pinch rolls, a synchro-bridge or the like, but when there is a need to fully preheat the cladding material depending on the temperature of the hot sheet or strip from the continuous caster of if the hot sheet or strip has an insufficient heat capacity, the assembly is preferably passed through a preheating zone for preheating. It is desirable that the preheating zone be provided with suitable preheating means.

The cast sheet or strip to be fed to the hot rolls suitably has a temperature of at least about 300° C. although the temperature varies with the kind of the cladding material and the reduction achieved by the hot rolls.

The preheated cladding material and the core sheet or strip are fed to the hot rolls while being held together in a proper position relative to each other. The assembly may be passed through a plurality of pairs of hot rolls arranged in succession, whilst the first pair of hot rolls may generally produce the reduction of about 40% or more. The hot-rolled metal clad may be coiled as it is or may susequently be cold-rolled for further reduction.

The metal clad thus continuously produced from molten aluminum or alloy thereof with a high efficiency and with reduced labor and energy has outstanding surface characteristics and mechanical properties. When prepared from suitably selected cladding and core materials, the metal clad is applicable to various uses. In fact, the continuous casting and cladding method of this invention has greatly increased application.

An example of this invention will be given below, to which the invention is in no way limited.

EXAMPLE

Figure 2:
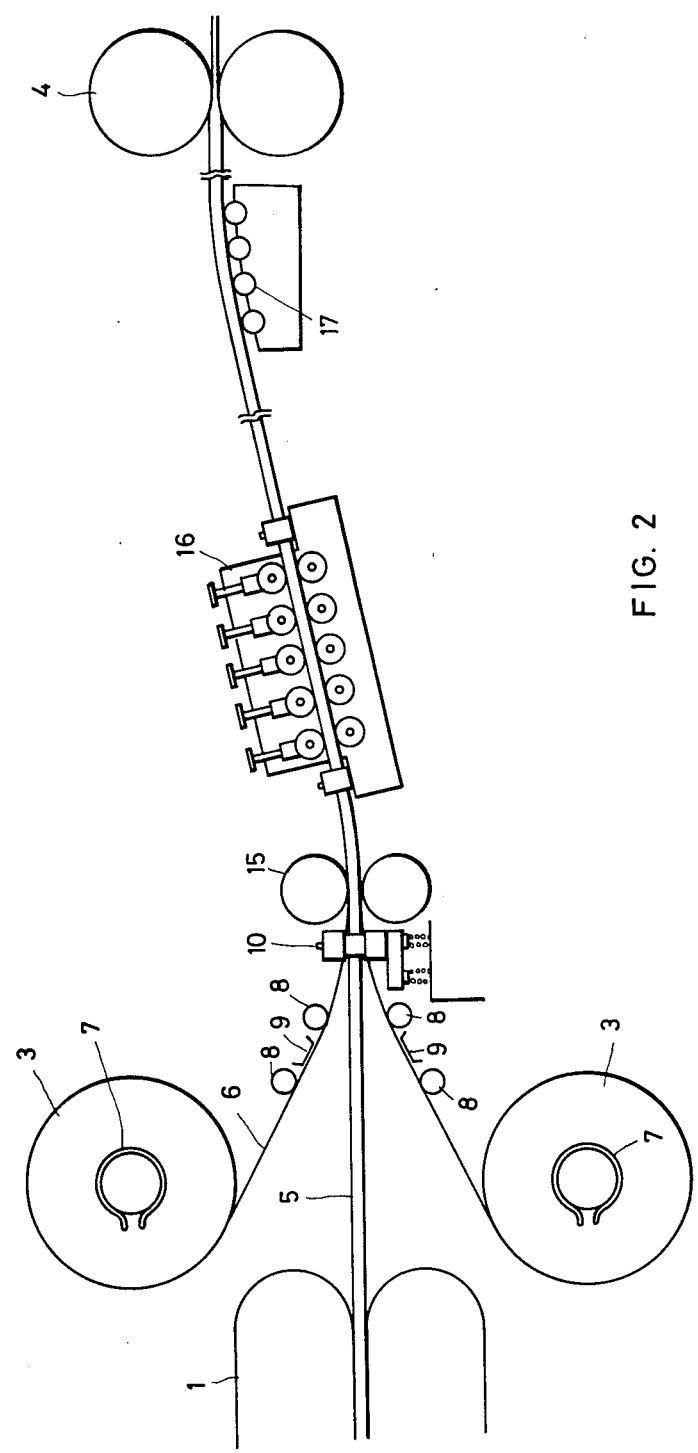
FIG. 2 is a side elevation showing the apparatus in a greater detail.

Clad aluminum was produced with the use of an apparatus of this invention as shown in FIG. 2 in which a Hazelett twin belt caster was used as the continuous caster 1.

Molten aluminum 1050 was supplied to the continuous caster 1 and continuously cast into a strip 5, 30 cm in width and 2 cm in thickness. Fully annealed and degreased high-purity aluminum sheets 6 measuring 30 cm in width and 2 mm in thickness and supported on the uncoilers 3 at room temperature were fed by the feed adjusting means onto both surfaces of the cast strip 5 sent out from the caster 1 at about 530° C. The sheets and strip were padded through the slits of two pairs of vertical rolls 13 as shown in FIGS. 3 and 4 and then fed to the pinch rolls 15, by which they were properly overlapped together. The cast strip had a temperature of about 500° C. when passing through the roll slits. Subsequently the resulting assembly was passed through the preheating zone 16 including three pairs of guide rolls and preheated to a surface temperature of 150° C. without using any auxiliary heat shource. The preheated assembly was fed to the hot rolls 4. The assembly was subjected to clad rolling by the first pair of hot rolls to a reduction of about 65%, then hot-rolled and thereafter cold-rolled to continuously obtain a clad 0.5 mm in thickness. The clad was found to be almost free from any cracks in its edges.

When the clad was microphotographically observed in section, the cladding high-purity aluminum and aluminum 1050 core were found to have been completely bonded together, and even the boundary was obscure.

With the use of a tester (product of Erichsen, West Germany) for shaping thin metal sheets, the clad was shaped to a cup of 55 mm in diameter at die clamping pressure of 200 kg/cm$^2$. The deep-drawn cup obtained was free of any separation whatever between the component materials.

A test piece No. 5 according to JIS Z2201 was cut out from the clad and subjected to tensile breaking test. The cladding sheets and core strip still remained bonded to each other completely intimately even at the ruptured portion.

When the clad was further chemically polished over the surface and subjected to anodic oxidation, the cladding material was found to perfectly retain the properties of high-purity aluminum, exhibiting very high gloss. This indicates that the clad is fully serviceable as a reflector plate.

We claim:

1. A continuous casting and cladding apparatus for the production of metal clads comprising:
   means having a continuous mold system and cooling means for continuously casting a molten metal, the mold system including a pair of opposed continuous revolving mold surfaces,
   at least one uncoiler having rotation restraining means for feeding a sheet or strip of cladding material,
   means for adjusting the feed of the cladding material onto at least one surface of a hot solidified cast sheet or strip withdrawn from the casting means, the feed adjusting means including a group of guide rolls and a guide plate and being operable at a variable speed in synchronism with a proper line speed,
   an overlaying unit for fitting the cladding material to the hot cast sheet or strip without permitting projection of the cladding material from the edges of the cast sheet or strip,
   pinch rolls for feeding the resulting assembly of the cast sheet or strip and the cladding material to a subsequent hot-rolling process, and hot rolls.

2. An apparatus as defined in claim 1 wherein two uncoilers are provided for said one surface of the cast sheet or strip to be cladded.

3. An apparatus as defined in claim 1 wherein the uncoiler is provided within a hot chamber.

4. An apparatus as defined in claim 1 wherein a gate roll is provided on the path of travel of the cast sheet or strip upstream from the overlaying unit, the gate roll being provided with means for transmitting the shift thereof to the feed adjusting means to control the feed adjusting means.

5. An apparatus as defined in claim 1 wherein the overlaying unit comprises at least one pair of vertical rolls having a definite slit width.

6. An apparatus as defined in claim 5 wherein the vertical rolls are grooved to provide a slit width for passing the cast sheet or strip therethrough which slit width is larger than the slit width for passing the cladding material.

7. An apparatus as defined in claim 1 wherein the overlaying unit comprises at least one pair of horizontal grooved rolls, the groove of one of the grooved rolls having a width corresponding to the width of the cast sheet or strip, the groove of the other roll having a width corresponding to the width of the cladding material.

8. An apparatus as defined in claim 7 wherein the width of the groove for the cast sheet or strip is larger than the width of the groove for the cladding material.

9. An apparatus as defined in claim 1 wherein a preheating zone comprising a group of guide rolls in series is provided between the pinch rolls and the hot rolls.

10. An apparatus as defined in claim 9 wherein the preheating zone has auxiliary heating means.

11. A method of continuously producing clad aluminum or aluminum alloy comprising the steps of:
    continuously feeding molten aluminum or aluminum alloy to one end of a mold space defined by a pair of rolls, a pair of belts, or the combination of a belt and a wheel or of caterpillar type tracks,
    withdrawing from the other end of the mold space a cast sheet or strip solidified by cooling and having a temperature of about 300° to about 580° C.,
    feeding a degreased cladding material to at least one surface of the cast sheet or strip in synchronism with a proper line speed,
    fitting the cladding material to the cast sheet or strip without permitting projection of the cladding material from the edges of the sheet or strip,
    preheating the cladding material as properly fitted to the cast sheet or strip in contact therewith, and
    hot-rolling the resulting assembly for cladding.

12. A method as defined in claim 1 wherein the cladding material is a high-purity aluminum sheet or strip.

13. A method as defined in claim 1 wherein the cladding material is a sheet or strip of commercial pure aluminum or an aluminum alloy.

14. A method as defined in claim 1 wherein the cladding material has been chemically etched or roughened over the surface thereof to be bonded to the cast sheet or strip.

15. A method as defined in claim 1 wherein the cladding material is smaller than the cast sheet or strip in width.

* * * * *